United States Patent Office 3,458,360
Patented July 29, 1969

3,458,360
ALKALINE CELL HAVING SILVER-MAGNESIUM ALLOY ELECTRODE
Sylvan Z. Beer and Yehuda L. Sandler, Pittsburgh, Pa., assignors, by mesne assignments, to the United States of America as represented by the Secretary of the Army
No Drawing. Filed Aug. 17, 1966, Ser. No. 573,132
Int. Cl. H01m 27/10, 13/06
U.S. Cl. 136—120                                     1 Claim

ABSTRACT OF THE DISCLOSURE

An alloy of silver and magnesium is used as an oxygen electrode in an alkaline fuel cell system; the alloy being formed by adding magnesium in small amounts to the silver by alloy formation and the alloy being suitably externally oxidized at a low oxygen partial pressure.

---

This invention relates to an oxygen electrode for use in an alkaline fuel cell system and particularly to the use of an alloy of silver and magnesium as such an oxygen electrode.

Heretofore, it has been known to use silver as the oxygen electrode of an alkaline fuel cell system. The use of silver as the oxygen electrode is not entirely desirable in that it is inefficient when the fuel cell is operated at low or intermediate temperatures, that is, between room temperature and about 300° C. When the fuel is hydrogen, the oxygen electrode, e.g., silver, is usually the main source of losses in the cells. Even at open circuit, the measured potential of the oxygen electrode is lower than the standard potential calculated for the reaction $H_2$ (gas) $+ \frac{1}{2} O_2$ (gas) $= H_2O$ (liquid), which is 1.23 volt at room temperature.

A general object of this invention is to provide an improved oxygen electrode for use in an alkaline fuel cell system. A particular object of this invention is to increase the potential and stability of an oxygen electrode in an alkaline fuel cell system operating between room temperature and about 300° C. when the oxygen electrode is a silver electrode.

It has now been found that when magnesium is added in small amounts to the silver by alloy formation and the alloy is suitably externally oxidized at a low oxygen partial pressure, the open circuit potential is raised significantly and correspondingly higher potentials are obtained when currents are drawn. Desirable results are obtained where the magnesium amounts to 1.7 weight percent of the alloy.

As an example, a silver-magnesium alloy containing 1.7 weight percent magnesium is annealed at 500° C. to 600° C. in an atmosphere of argon containing small amounts of oxygen, for example, 1 percent oxygen at 500° C. down to a few parts per million of oxygen at 600° C. and its polarization characteristics measured in a 15 percent aqueous potassium hydroxide solution at 25° C. in one atmosphere of oxygen against a hydrogen electrode in the same medium. The potentials of the silver-magnesium alloy are found to be about 100 millivolts higher than in the case of pure silver samples. The gain represents an increase of as much as one decade or more in current at the same potential. Moreover, the potential of the alloy electrode is less susceptible to change with time than the pure silver. When cathodic sweeps are taken, a comparison with pure silver shows the polarization of the alloy electrode to be lower throughout.

The above set forth effect obtained with the silver-1.7 weight percent magnesium alloy is believed in part to be connected with the increased stability of the oxygen in the surface lattice of the electrode. The open circuit potential of 1.12 to 1.18 volt obtained with the alloy is close to the theoretical potential of the $Ag/Ag_2O/OH$-half cell of 1.18 volt. This potential is not obtained with pure silver after drawing a cathodic current, presumably because of slowness of the nucleation of the oxide. In the presence of MgO, the corresponding phase is apparently not destroyed by cathodization.

It is expected that similar effects may be obtained by alloy formation of silver with other metals less noble than silver. Alloy formation of other noble oxygen electrode metals like platinum and gold with less noble metals may lead to a similar result.

The foregoing description is to be considered merely as illustrative of the invention and not in limitation thereof.

What is claimed is:

1. An alkaline fuel cell comprising a fuel electrode and oxygen electrode, said oxygen electrode consisting of an alloy of silver and magnesium wherein the magnesium amounts to about 1.7 weight percent of the alloy, said alloy electrode being externally oxidized at a low oxygen partial pressure.

References Cited

UNITED STATES PATENTS

| | | | |
|---|---|---|---|
| 2,161,574 | 6/1939 | Hensel et al. | 75—173 |
| 2,180,827 | 11/1939 | Hensel et al. | 75—173 |
| 2,207,292 | 7/1940 | Hensel et al. | 75—173 XR |
| 3,341,446 | 9/1967 | Vielstich et al. | 136—120 XR |

WINSTON A. DOUGLAS, Primary Examiner

A. SKAPARS, Assistant Examiner

U.S. Cl. X.R.
136—20, 100